(12) United States Patent
Li et al.

(10) Patent No.: US 11,488,000 B2
(45) Date of Patent: Nov. 1, 2022

(54) OPERATION APPARATUS AND METHOD FOR ACCELERATION CHIP FOR ACCELERATING DEEP NEURAL NETWORK ALGORITHM

(71) Applicant: Institute of Computing Technology, Chinese Academy of Sciences, Beijing (CN)

(72) Inventors: Zhen Li, Beijing (CN); Shaoli Liu, Beijing (CN); Shijin Zhang, Beijing (CN); Tao Luo, Beijing (CN); Cheng Qian, Beijing (CN); Yunji Chen, Beijing (CN); Tianshi Chen, Beijing (CN)

(73) Assignee: Intitute of Computing Technology, Chinese Academy of Sciences, Beijing (CN)

( * ) Notice: Subject to any disclaimer, the term of this patent is extended or adjusted under 35 U.S.C. 154(b) by 1170 days.

(21) Appl. No.: 15/770,457

(22) PCT Filed: Jun. 17, 2016

(86) PCT No.: PCT/CN2016/086098
§ 371 (c)(1),
(2) Date: Apr. 23, 2018

(87) PCT Pub. No.: WO2017/084330
PCT Pub. Date: May 26, 2017

(65) Prior Publication Data
US 2018/0314928 A1 Nov. 1, 2018

(30) Foreign Application Priority Data
Nov. 17, 2015 (CN) .......................... 201510792463.0

(51) Int. Cl.
*G06N 3/063* (2006.01)
*G06N 3/08* (2006.01)
(Continued)

(52) U.S. Cl.
CPC ............. *G06N 3/063* (2013.01); *G06F 17/16* (2013.01); *G06N 3/0454* (2013.01); *G06N 3/084* (2013.01)

(58) Field of Classification Search
CPC ........ G06N 3/06; G06N 3/063; G06N 3/0454; G06N 3/084; G06F 17/16
See application file for complete search history.

(56) References Cited

U.S. PATENT DOCUMENTS 6,523,018 B1 * 2/2003 Louis ..................... G06N 3/063
706/26
2007/0022063 A1 * 1/2007 Lightowler ............ G06N 3/063
706/15
(Continued)

FOREIGN PATENT DOCUMENTS

CN          101299233        11/2008
CN          101527010         9/2009
(Continued)

OTHER PUBLICATIONS

Chen, Yunji, et al. "Dadiannao: A machine-learning supercomputer." 2014 47th Annual IEEE/ACM International Symposium on Microarchitecture. IEEE, 2014: 609-622 (Year: 2014).*
(Continued)

*Primary Examiner* — Kamran Afshar
*Assistant Examiner* — Randall K. Baldwin
(74) *Attorney, Agent, or Firm* — Maschoff Brennan

(57) ABSTRACT

The present disclosure provides an operation apparatus and method for an acceleration chip for accelerating a deep neural network algorithm. The apparatus comprises: a vector
(Continued)

addition processor module and a vector function value arithmetic unit and a vector multiplier-adder module wherein the three modules execute a programmable instruction, and interact with each other to calculate values of neurons and a network output result of a neural network, and a variation amount of a synaptic weight representing the interaction strength of the neurons on an input layer to the neurons on an output layer; and the three modules are all provided with an intermediate value storage region and perform read and write operations on a primary memory.

7 Claims, 5 Drawing Sheets

(51) Int. Cl.
*G06N 3/04* (2006.01)
*G06F 17/16* (2006.01)

(56) References Cited

U.S. PATENT DOCUMENTS

| 2008/0319933 | A1* | 12/2008 | Moussa | G06N 3/084 706/31 |
| 2013/0311412 | A1* | 11/2013 | Lazar | H03M 1/82 706/16 |
| 2015/0170021 | A1* | 6/2015 | Lupon | G06N 3/063 706/15 |
| 2015/0178246 | A1* | 6/2015 | Herrero Abellanas | G06K 9/627 708/300 |
| 2015/0378734 | A1* | 12/2015 | Hansen | G06F 9/30181 712/226 |
| 2016/0092765 | A1* | 3/2016 | Chilimbi | G06N 3/084 709/201 |
| 2016/0379115 | A1* | 12/2016 | Burger | G06N 3/063 706/25 |
| 2017/0011288 | A1* | 1/2017 | Brothers | G06F 9/3017 |

FOREIGN PATENT DOCUMENTS

| CN | 102855122 | 1/2013 |
| CN | 105468335 | 4/2016 |
| CN | 105488565 | 4/2016 |

OTHER PUBLICATIONS

International Search report dated Sep. 20, 2016, in related PCT Application No. PCT/CN2016/086098.

* cited by examiner

OPERATION APPARATUS AND METHOD FOR ACCELERATION CHIP FOR ACCELERATING DEEP NEURAL NETWORK ALGORITHM

TECHNICAL FIELD

The present disclosure belongs to the fields of the neural network algorithm and the computer hardware. In particular, the present disclosure relates to an operation apparatus and a method for an acceleration chip for accelerating a deep neural network algorithm.

BACKGROUND

Since 1980, an artificial neural network algorithm became an arising research hot spot in the artificial intelligent field. This algorithm abstracts a network of neurons in the brain from the aspect of information processing, builds certain simple model, and forms different networks according to different connecting ways. The algorithm has automatic learning function, and may gradually learn to recognize and predict by training; associative storage function, and has very high algorithm robustness; high degree of parallelism, has a capability of searching for an optimal solution in high speed, and rapidly finds out the optimal solution for the problem of complex big data; strong plasticity, and may sufficiently approach any complex non-linear relation; has strong information comprehensive capability, and can process quantitative and qualitative information simultaneously so as to be adapted to multi-information integration and multi-media techniques.

Recently, with continuously deepening of research in the artificial neural network, great progress has been achieved. It has successfully solved many practical problems that are difficult to be solved with traditional computer methods in the fields, such as, image processing, pattern recognition, intelligent robot, automatic control, prediction and estimation, biology, medicine, economy and the like, represents good intelligent features, and pushes the information processing technique and the artificial intelligence to develop continuously.

Although the neural network has achieved a wide success in many fields, at current stage, most of the neural network algorithms are optimized on a software algorithm level, and constructed and run on general CPU or GPU. Considering that the general processor has a relatively low performance and power ratio, it has become a common urgent need to efficiently achieve the neural network algorithm.

It is also proposed in the background art a hardware realization method and a system for an artificial neural network algorithm. As compared to the prior art, it overcomes an awkwardness of completing parallel calculation with a serial mode in implementation of former software, and replaces deficiencies in implementation of the software. Moreover, since algorithm is optimized, large hardware resources are saved, the cost is low to implement on a FPGA platform, a dilemma that SIGMOID function is difficult to be implemented with hardware is avoided using optimized algorithm, and the hardware resources are also saved using the accumulation way. However, this patent merely implements the artificial neural network algorithm through the FPGA platform. In design of modern processors, a heterogeneous multi-core processor framework is considered as a promising path to achieve a method for calculating low energy source of the performance. It is known to all that, during operation of the neural network algorithm, a series of intermediate values will be produced, and the intermediate values are used to calculate the values of neurons on the output layer, or calculate a variation amount of a synaptic weight for once or several times subsequently. When the intermediate values are stored in a primary memory using the way of storing the general processor, one significant problem to be faced is that a large number of intermediate values are generated and have to be stored, such that space of the primary memory is increased. Meanwhile, such method increases the number of times of storing the intermediate values to the primary memory, or reading the intermediate values from the primary memory, increases power consumption of the chip, and does not comply with the design concept of the low power consumption acceleration chip.

SUMMARY

An object of the present disclosure is to provide an operation apparatus of an acceleration chip for accelerating a deep neural network algorithm and a method thereof, which can reduce the number of times of reading and writing the intermediate values of a primary memory, reduce the energy consumption of an acceleration chip, and avoid the problems of data missing and replacement during a data processing process.

Regarding an operation apparatus for an acceleration chip for accelerating a deep neural network algorithm of the present disclosure, it comprises:

a vector addition processor module for performing addition or subtraction of a vector, and/or vectorized operation of a pooling layer algorithm in the deep neural network algorithm;

a vector function value arithmetic unit module for performing a vectorized operation of a non-linear evaluation in the deep neural network algorithm; and a vector multiplier-adder module for performing a multiply-add operation on the vector;

the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer;

the vector addition processor module, the vector function value arithmetic unit module and the vector multiplier-adder module are all provided with an intermediate value storage region respectively for storing the vectorized intermediate values calculated according to the instructions and performing read and write operations on a primary memory.

Regarding the operation apparatus for an acceleration chip for accelerating a deep neural network algorithm of the present disclosure, after the vector addition processor module, the vector function value arithmetic unit module and the vector multiplier-adder module generate an output value, the intermediate values stored in the intermediate value storage regions are discarded.

As regards to the operation apparatus for an acceleration chip for accelerating a deep neural network algorithm of the present disclosure, the intermediate value storage regions of the vector addition processor module, the vector function value arithmetic unit module and the vector multiplier-adder module are configured as a random-access memory.

As regards to the operation apparatus for an acceleration chip for accelerating a deep neural network algorithm of the present disclosure, the random-access memory is configured to store the intermediate values produced itself from each of the neurons and the variation amount of synaptic weight.

Regarding the operation apparatus for an acceleration chip for accelerating a deep neural network algorithm of the present disclosure, the vector addition processor module, the vector function value arithmetic unit module and the vector multiplier-adder module access the intermediate value storage regions through an index.

Moreover, the present application further provides a operating means by using the above operation apparatus for an acceleration chip for accelerating a deep neural network algorithm, the operation apparatus comprising:

a vector addition processor module for performing addition or subtraction of a vector, and/or a vectorized operation of a pooling layer algorithm in the deep neural network algorithm;

a vector function value arithmetic unit module for performing a vectorized operation of a non-linear evaluation in the deep neural network algorithm; and a vector multiplier-adder module for performing a multiply-add operation on vectors;

the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer;

the vector addition processor module, the vector function value arithmetic unit module and the vector multiplier-adder module are all provided with an intermediate value storage region respectively for storing a vectorized intermediate value calculated according to the instructions, and perform read and write operations on the primary memory;

the means comprises the following steps:

a step of vector addition processing operation, in which the vector addition processor module performs addition or subtraction of a vector, and/or a vectorized operation of a pooling layer algorithm in the deep neural network algorithm according to an instruction;

a step of vector function value operation, in which a vector function value arithmetic unit module performs a vectorized operation of a non-linear evaluation in the deep neural network algorithm according to an instruction; and a step of vector multiply-add operation, in which a vector multiplier-adder module performs a multiply-add operation on the vector according to an instruction;

the step of vector addition processing operation, the step of vector function value operation and the step of vector multiply-add operation interact with each other to calculate values of neurons and a network output result of a neural network, and a variation amount of a synaptic weight representing the interaction strength of the neurons on an input layer to the neurons on an output layer;

the vectorized intermediate values produced by the step of vector addition processing operation, the step of vector function value operation and the step of vector multiply-add operation are stored in the intermediate value storage regions of the vector addition processor module, the vector function value arithmetic unit module and the vector multiplier-adder module, and the intermediate value storage regions may perform read and write operations on the primary memory.

Regarding the means by using the operation apparatus for operating an acceleration chip for accelerating a deep neural network algorithm of the present disclosure, in the step of vector addition processing operation, the step of vector function value operation and the step of vector multiply-add operation, after an output value is generated, the intermediate values stored in the intermediate value storage regions are discarded.

Regarding to the means by using the operation apparatus for operating an acceleration chip for accelerating a deep neural network algorithm of the present disclosure, in the step of vector addition processing operation, the step of vector function value operation and the step of vector multiply-add operation, the intermediate value storage regions are accessed through an index.

Regarding the means by using the operation apparatus for operating an acceleration chip for accelerating a deep neural network algorithm of the present disclosure, in the step of vector addition processing operation, the step of vector function value operation and the step of vector multiply-add operation, if the unwritten positions of a storage block designated by the index previously within the intermediate value storage regions are requested to be read, the intermediate value storage regions refuse this reading request, and the flag which is returned to indicate the success of data reading is invalid.

Regarding the means by using the operation apparatus for operating an acceleration chip for accelerating a deep neural network algorithm of the present disclosure, in the step of vector addition processing operation, the step of vector function value operation and the step of vector multiply-add operation, if the written positions of a storage block designated by the index previously within the intermediate value storage regions are requested to be written, the intermediate value storage regions refuse this writing request, and the flag which is returned to indicate the success of data writing is invalid.

Moreover, the present application further provides an acceleration chip for accelerating a deep neural network algorithm, comprising:

a primary memory for performing read and write operations simultaneously via the data bus;

a vector addition processor module for performing addition or subtraction of a vector, and/or a vectorized operation of a pooling layer algorithm in the deep neural network algorithm;

a vector function value arithmetic unit module for performing a vectorized operation of a non-linear evaluation in the deep neural network algorithm; and a vector multiplier-adder module for performing a multiply-add operation on vectors;

the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer;

the vector addition processor module, the vector function value arithmetic unit module and the vector multiplier-adder module are all provided with an intermediate value storage region respectively for storing a vectorized intermediate value calculated according to the instructions, and perform read and write operations on the primary memory.

Regarding the acceleration chip for accelerating a deep neural network algorithm according to the present disclosure, wherein after the vector addition processor module, the vector function value arithmetic unit module and the vector multiplier-adder module generate an output value, the intermediate values stored in the intermediate value storage regions are discarded.

Regarding the acceleration chip for accelerating a deep neural network algorithm according to the present disclosure, wherein the intermediate value storage regions of the vector addition processor module, the vector function value arithmetic unit module and the vector multiplier-adder module are configured as a random access memory.

Regarding the acceleration chip for accelerating a deep neural network algorithm according to claim 13, wherein the random access memory is configured to store the intermediate values produced itself from each of the neurons and the variation amount of the synaptic weight.

Regarding the acceleration chip for accelerating a deep neural network algorithm according to the present disclosure, wherein the vector addition processor module, the vector function value arithmetic unit module and the vector multiplier-adder module access the intermediate value storage regions through an index.

Moreover, the present application further provides a acceleration means by an acceleration chip for accelerating a deep neural network algorithm, the acceleration chip comprising:

a primary memory for performing read and write operations simultaneously via the data bus;

a vector addition processor module for performing addition or subtraction of a vector, and/or a vectorized operation of a pooling layer algorithm in the deep neural network algorithm;

a vector function value arithmetic unit module for performing a vectorized operation of a non-linear evaluation in the deep neural network algorithm; and a vector multiplier-adder module for performing a multiply-add operation on vectors;

the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer;

the vector addition processor module, the vector function value arithmetic unit module and the vector multiplier-adder module are all provided with an intermediate value storage region respectively for storing a vectorized intermediate value calculated according to the instructions, and perform read and write operations on the primary memory;

the means comprising the following steps:

a step of vector addition processing operation, in which a vector addition processor module performs addition or subtraction of a vector, and/or a vectorized operation of a pooling layer algorithm in the deep neural network algorithm according to an instruction;

a step of vector function value operation, in which a vector function value arithmetic unit module performs a vectorized operation of a non-linear evaluation in the deep neural network algorithm according to an instruction; and a step of vector multiply-add operation, in which a vector multiplier-adder module performs a multiply-add operation on the vector according to an instruction;

the step of vector addition processing operation, the step of vector function value operation and the step of vector multiply-add operation interact with each other to calculate values of neurons and a network output result of a neural network, and a variation amount of a synaptic weight representing the interaction strength of the neurons on an input layer to the neurons on an output layer;

the vectorized intermediate values produced by the step of vector addition processing operation, the step of vector function value operation and the step of vector multiply-add operation are stored in the intermediate value storage regions of the vector addition processor module, the vector function value arithmetic unit module and the vector multiplier-adder module, and the intermediate value storage regions may perform read and write operations on the primary memory.

Regarding the acceleration means by the acceleration chip for accelerating a deep neural network algorithm according to the present disclosure, wherein:

in the step of vector addition processing operation, the step of vector function value operation and the step of vector multiply-add operation, after an output value is generated, the intermediate values stored in the intermediate value storage regions are discarded.

As regards to the acceleration means by the acceleration chip for accelerating a deep neural network algorithm according to the present disclosure, wherein:

in the step of vector addition processing operation, the step of vector function value operation and the step of vector multiply-add operation, the intermediate value storage regions are accessed through an index.

Regarding to the acceleration means by the acceleration chip for accelerating a deep neural network algorithm according to the present disclosure, wherein:

in the step of vector addition processing operation, the step of vector function value operation and the step of vector multiply-add operation, if the unwritten positions of a storage block designated by the index previously within the intermediate value storage regions are requested to be read, the intermediate value storage regions refuse this reading request, and the flag which is returned to indicate the success of data reading is invalid.

Regarding the acceleration means by the acceleration chip for accelerating a deep neural network algorithm according to the present disclosure, wherein:

in the step of vector addition processing operation, the step of vector function value operation and the step of vector multiply-add operation, if the written positions of a storage block designated by the index previously within the intermediate value storage regions are requested to be read, the intermediate value storage regions refuse this writing request, and the flag which is returned to indicate the success of data reading is invalid.

DETAILED DESCRIPTION

In order to make the object, the technical solution and advantages of the present disclosure much clearer, an operation apparatus and a method for an acceleration chip for accelerating a deep neural network algorithm in the present disclosure are further explained in detail below with reference to the drawings.

Figure 1:
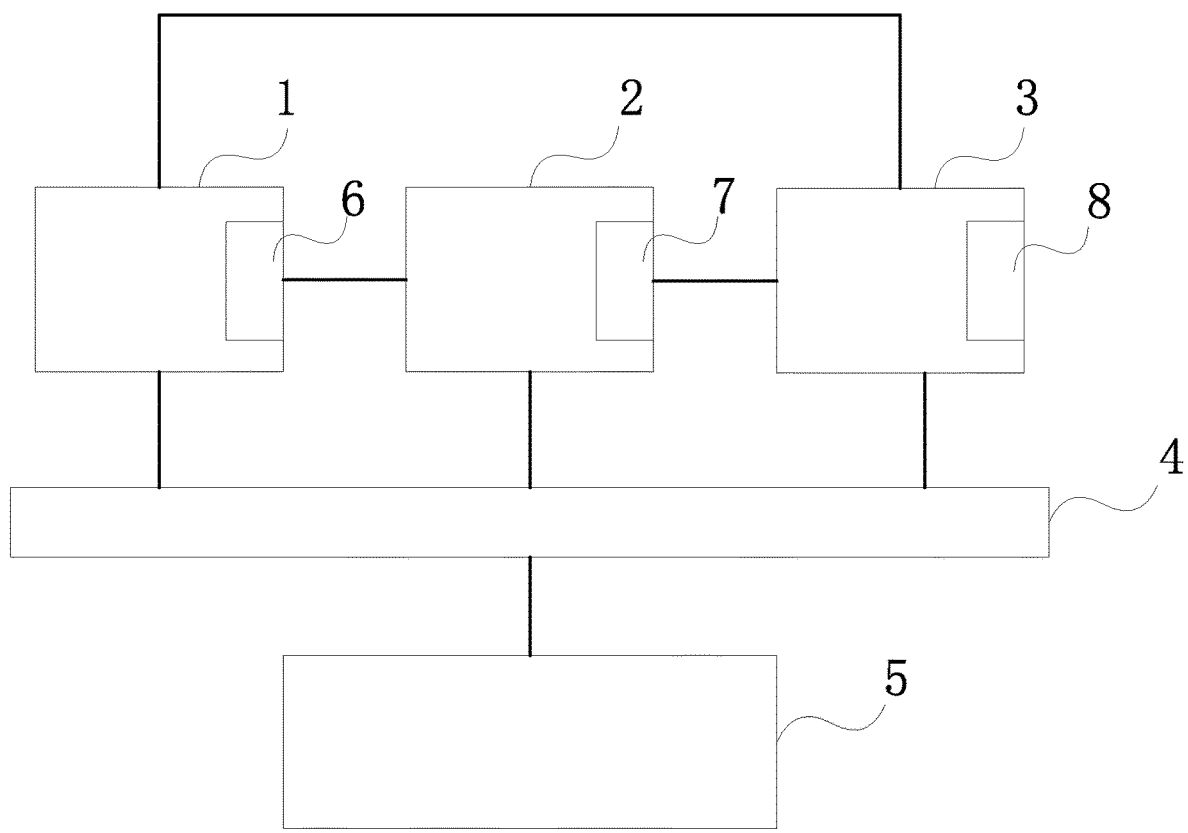
FIG. 1 is a relation diagram between respective constituted modules and a primary memory of an operation apparatus for an acceleration chip for accelerating a deep neural network algorithm according to the present disclosure.

FIG. 1 is a relation diagram between respective constituted modules and a primary memory of an operation apparatus for an acceleration chip for accelerating a deep neural network algorithm according to the present disclosure. The operation apparatus comprises a vector addition processor 1, a vector function value arithmetic unit 2 and a vector multiplier-adder 3, wherein the vector addition processor 1, the vector function value arithmetic unit 2 and the vector multiplier-adder 3 include intermediate value storage regions 6, 7 and 8 respectively, and may perform read and write operations on the primary memory 5 simultaneously via the data bus 4. The vector addition processor 1 is configured to perform addition or subtraction of a plurality of (no less than two) vectors, and a vectorized operation of various types of pooling layer algorithms in the deep neural network algorithm; the vector function value arithmetic unit 2 is configured to perform a vectorized operation of a non-linear evaluation in the deep neural network algorithm, including calculation of a function value when outputting values of neurons, and calculation of a derivative value, etc. when using a back propagation (BP) algorithm. The vector multiplier-adder 3 is configured to perform a multiply-add operation on the vector, wherein two vectors may be calculated firstly, similar to multiplication of an inner product, where respective components are multiplied one by one, then a third vector is added or subtracted; or, on the contrary, the two vectors are added or subtracted, then the third vector is multiplied as stated above; wherein the above three functional modules are configured to execute programmable instructions, and interact with each other to calculate values of neurons and a network output result of a neural network, and a variation amount of a synaptic weight representing the interaction strength of the neurons on an input layer to the neurons on an output layer, and interactive contents are the intermediate values produced during operation. During operation, the functional modules will produce a large number of intermediate values stored in the intermediate value storage regions of the functional parts.

Since the three functional parts of the calculating part for an acceleration chip for accelerating a deep neural network algorithm possessed by the operation apparatus of the present disclosure have intermediate value storage regions, and the intermediate values generated during operation may be stored, without writing them into the primary memory.

The intermediate values stored in the intermediate value storage regions of the three functional modules of the functional parts are discarded by the functional modules themselves, or other two functional modules, so as to generate a desired output value. Since the apparatus is based on the vectorized neurons when calculating, such that the desired intermediate value storage regions store equivalent neurons and weight of the related portion, a chip area and power consumption consumed by the desired intermediate value storage regions is maintained in a relatively affordable range.

The output value of the operation apparatus includes values of neurons, a network output result, and a variation amount of a synaptic weight representing the interaction strength of the neurons on an input layer to the neurons on an output layer. After calculating and obtaining the output value, the related intermediate values are discarded to save storage cells of the intermediate value storage regions, which facilitate improving a utilization ratio of the intermediate value storage regions.

Action of the intermediate value storage regions of the functional modules of the functional parts is similar to a random storage region, and the intermediate value storage regions are accessed through an index. Meanwhile, in order to avoid damage to correctness of the algorithm due to data conflict, the intermediate value storage regions have a conflict detection mechanism in which if the unwritten positions of a storage block designated by the index previously within the intermediate value storage regions are requested to be read, the intermediate value storage regions refuse this reading request, and the flag which is returned to indicate the success of data reading is invalid; and if the written positions of a storage block designated by the index previously within the intermediate value storage regions are requested to be written, the intermediate value storage regions refuse this writing request, and the flag which is returned to indicate the success of data writing is invalid.

In examples of other general processor, the intermediate values of the neural network algorithm are sequentially stored in the designated regions of the primary memory. In these examples, the caches between the processor and the primary memory may store the intermediate values, so as to reduce the number of times of reading and writing the intermediate values of the primary memory, and reduce time delay and energy consumption for reading the intermediate values. However, this method is limited by the size of cache blocks and a block correlation mechanism, may cause frequent missing and replacement of the cache blocks, and causes severe damage to performance and increases power consumption.

The present disclosure stores the intermediate values in the intermediate value storage regions of the three functional modules of the functional parts, which reduces the number of times of reading and writing the intermediate values of the primary memory, and allows a distance of the intermediate values to be closer to the functional module using it, and the consumed energy to be lower. Moreover, it avoids the problems of data missing and replacement as mentioned above, and improves acceleration performance of the acceleration chip.

With respect to characteristics of the deep neural network algorithm, some optimization designs are further made on the intermediate value storage regions of the present disclosure, and support continuous writing and reading the memory address of certain intermediate values for several times through a counter in response to the instructions, which greatly promotes acceleration performance of accelerator chip, such as, calculation of the pooling layer in the Convolutional Neural Network (CNN).

Since interaction among the three functional modules of the operation apparatus is the intermediate values produced by calculation, the intermediate values produced by the functional modules are discarded themselves, and may also be used by other two functional modules.

Figure 2:
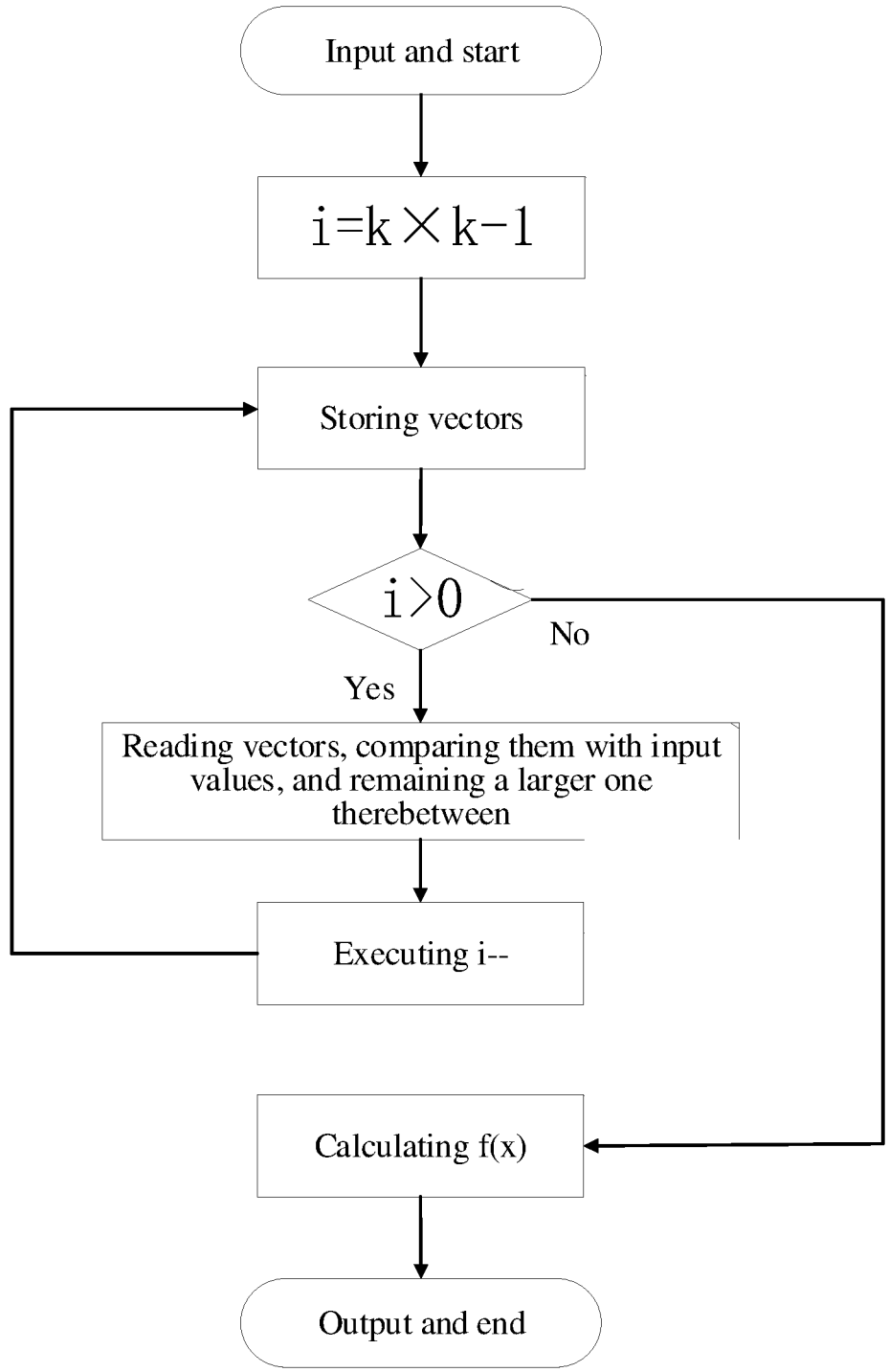
FIG. 2 is a Max Pooling flow chart of a Convolutional Neural Network (CNN) algorithm.

FIG. 2 is a flow chart, which schematically illustrates a Max Pooling layer of a Convolution Neural Network (CNN) algorithm. A vectorized pooling scheme is adopted in the present disclosure, and respective components of each of the vectors are neurons of continuously adjacent feature map at the same position. Supposing that a size of Pooling kernel is k×k, calculation of output neurons of the vector on each Pooling output layer requires input neurons of the vector on k×k input layers, the maximum value of the input neurons in the Pooling kernel on the feature map corresponding to each of vector component representatives is obtained by the vector addition processor 1, and then the values of the output neurons are calculated by the vector function value arithmetic unit 2.

During this operation, the vector addition processor 1 performs continuous reading and writing of certain address of the same intermediate value region 6 for k×k−1 times, and the intermediate values which are written finally is used to output values of neurons on an output layer calculated by the vector function value arithmetic unit 2, and written into the primary memory 5. Meanwhile, the address state of the intermediate value storage region 6 for storing the intermediate values changes, and a group of intermediate values may be further written.

Figure 3:
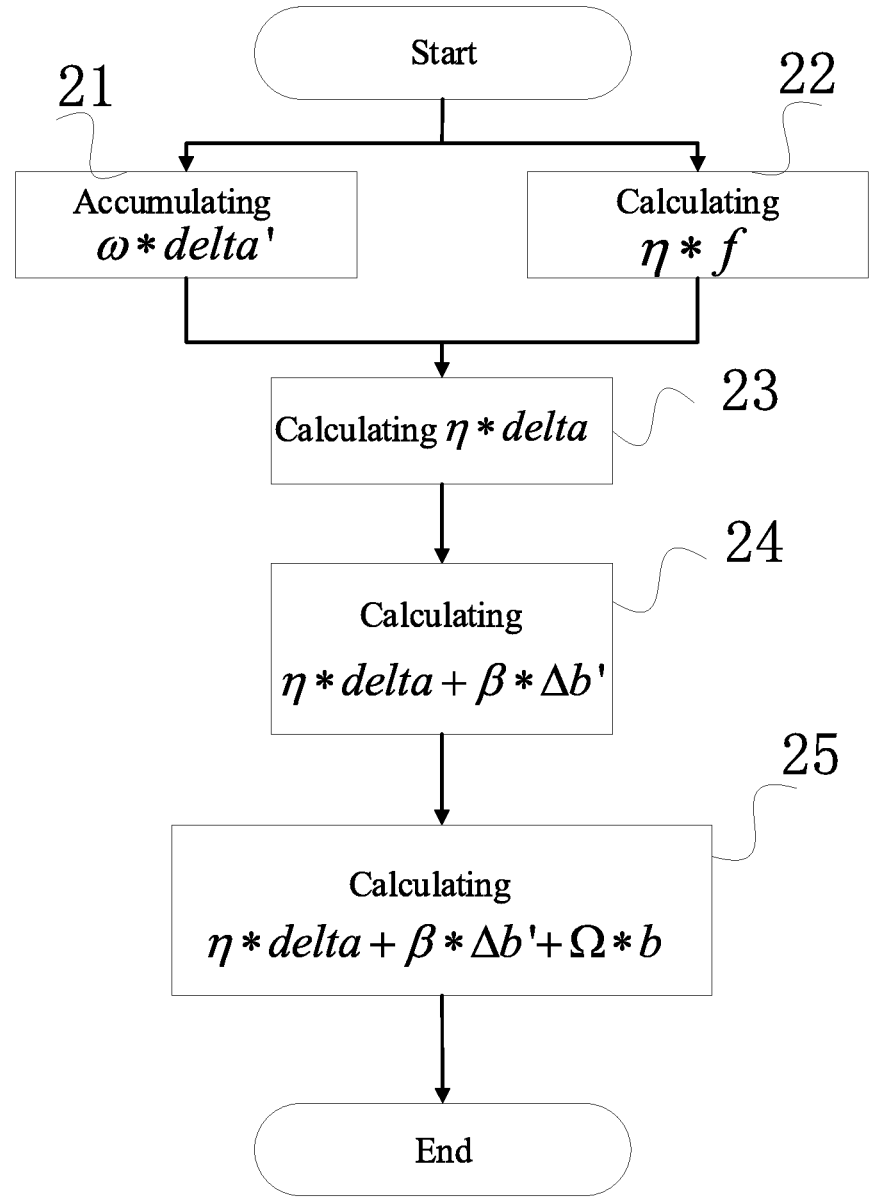
FIG. 3 is a flow chart that the CNN reversely updates bias.

FIG. 3 is another flow chart, which schematically illustrates the reversely training bias of the CNN algorithm. According to formula of the algorithm, $$b = \eta * \text{delta} + \beta * \Delta b' + \Omega * b$$

wherein, Δb' is a modified value of bias trained last time, and delta is a hack propagation gradient. As shown in step 21 of FIG. 3, according to the algorithm, the back propagation gradient is delta=f'(v)Σω*delta', wherein delta' a gradient value of the output neurons.

During operation, partial sums of ω*delta' have been calculated by other functional parts, so the partial sums are added by the vector addition processor 1 to obtain a summarized intermediate value of the partial sums, as shown in step 22 of FIG. 3, while η*f' is calculated by the vector function value arithmetic unit 2, two groups of the intermediate values are stored in the intermediate value storage regions 6 and 7, respectively as shown in step 23 of FIG. 3, and then an intermediate value of η*delta is calculated by the vector multiplier-adder 3, and stored in the intermediate value storage region 8. Next as shown in step 24 of FIG. 3, an intermediate value of η*delta+β*Δb' is calculated still by the vector multiplier-adder 3, and stored at the same position of the intermediate value storage region 8. Finally as shown in step 25 of FIG. 3, the vector multiplier-adder 3 calculates and outputs η*delta+β*Δb'+Ω*b. The above procedure can be carried out in a way of pipeline by adjusting the instruction sequence with a compiler, in this regard, the performance of the acceleration chip can be improved and the space of the intermediate value storage regions can be saved.

Figure 4:
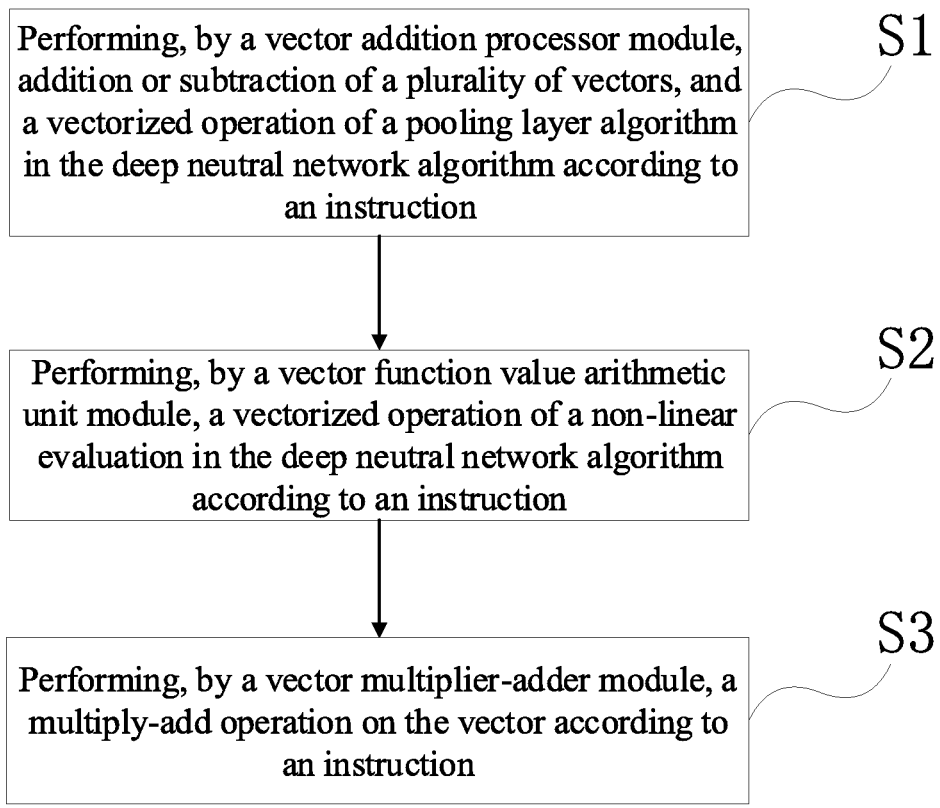
FIG. 4 is a flow chart of a method for operating an acceleration chip for accelerating a deep neural network algorithm of the present disclosure.

Moreover, the present disclosure further provides a method for operating an acceleration chip for accelerating a deep neural network algorithm, and the method is carried out by using the above operation apparatus. As shown in FIG. 4, the method comprises the following steps:

a step of vector addition processing operation (step S1), in which the vector addition processor module performs addition or subtraction of a plurality of vectors, and/or a vectorized operation of a pooling layer algorithm in the deep neural network algorithm according to an instruction;

a step of vector function value operation (step S2), in which the vector function value arithmetic unit module performs a vectorized operation of a non-linear evaluation in the deep neural network algorithm according to an instruction; and a step of vector multiply-add operation (step S3), in which the vector multiplier-adder module performs a multiply-add operation on the vector according to an instruction;

the step of vector addition processing operation, the step of vector function value operation and the step of vector multiply-add operation interact with each other to calculate values of neurons and a network output result of a neural network, and a variation amount of a synaptic weight representing the interaction strength of the neurons on an input layer to the neurons on an output layer;

the vectorized intermediate values produced by the step of vector addition processing operation, the step of vector function value operation and the step of vector multiply-add operation are stored in the intermediate value storage regions of the vector addition processor module, the vector function value arithmetic unit module and the vector multiplier-adder module, and the intermediate value storage regions may perform read and write operations on the primary memory.

Regarding the method for improving the acceleration performance of an acceleration chip of a neural network algorithm, in the step of vector addition processing operation, the step of vector function value operation and the step of vector multiply-add operation, after an output value is generated, the intermediate values stored in the intermediate value storage regions are discarded.

Regarding the method for improving the acceleration performance of an acceleration chip of a neural network algorithm, in the step of vector addition processing operation, the step of vector function value operation and the step of vector multiply-add operation, the intermediate value storage regions are accessed through an index.

Regarding the method for improving the acceleration performance of an acceleration chip of a neural network algorithm, in the step of vector addition processing operation, the step of vector function value operation and the step of vector multiply-add operation, if the unwritten positions of a storage block designated by the index previously within the intermediate value storage regions are requested to be read, the intermediate value storage regions refuse this reading request, and the flag which is returned to indicate the success of data reading is invalid.

Regarding the method for improving the acceleration performance of an acceleration chip of a neural network algorithm, in the step of vector addition processing operation, the step of vector function value operation and the step of vector multiply-add operation, if the written positions of a storage block designated by the index previously within the intermediate value storage regions are requested to be read, the intermediate value storage regions refuse this writing request, and the flag which is returned to indicate the success of data reading is invalid.

Figure 5:
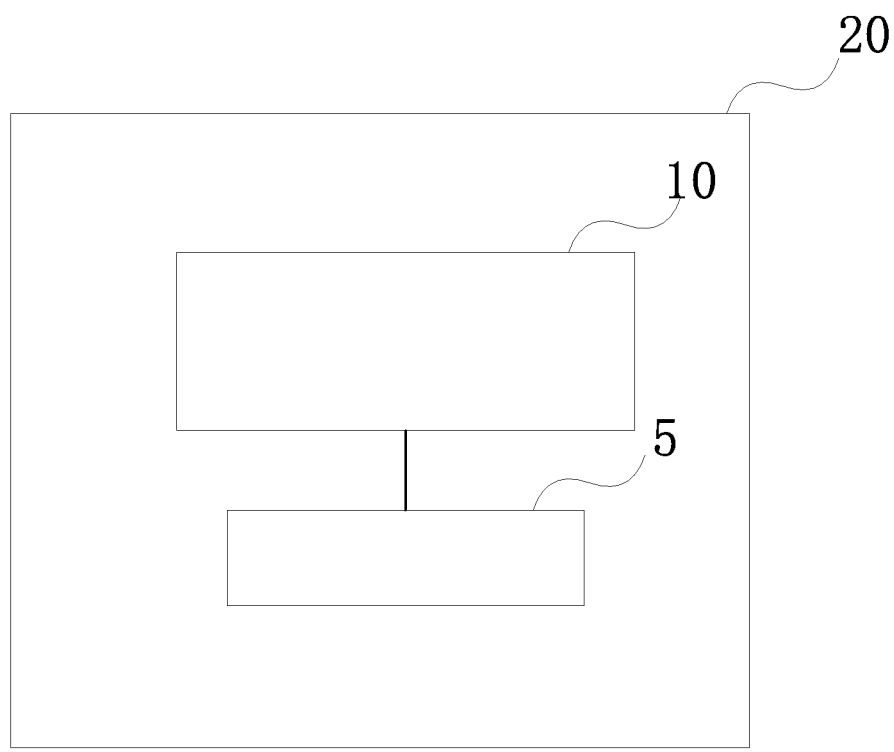
FIG. 5 is a brief structure diagram of an acceleration chip having the operation apparatus for an acceleration chip for accelerating a deep neural network algorithm of the present disclosure.

FIG. 5 is a brief structure diagram of an acceleration chip having the operation apparatus for accelerating a deep neural network algorithm of the present disclosure 20 in FIG. 5 is the acceleration chip of neural network algorithm, 10 in FIG. 5 is the operation apparatus of the acceleration chip of accelerating a deep neural network algorithm, and 5 in FIG. 5 is the primary memory.

The present disclosure may be applied in many general or special computer system environments or configurations, such as, personal computer, server computer, handheld or portable device, flat type device, multiprocessor system, microprocessor-based system, set-top box, programmable consumer electronic device, network PC, minicomputer, mainframe computer, distributed computing environment including any system or device thereof, and the like.

The present disclosure may be described in general context of the computer executable instructions executed by the computer, such as, a program module. Generally, the program module includes routines, programs, objects, assemblies, data structures, and the like that execute specific task, or achieve specific abstract data type.

In the present disclosure, "module", "apparatus" and "system" refer to the related physical objects applied to the computer, such as, hardware, combination of hardware and software, software or software in execution, etc.

Further, the terms "comprise" and "include" not only comprise those factors, but also comprise other factors that are not clearly listed, or further comprise inherent factors of the procedure, method, article or device. Under the circumstance of having no further limitation, the factor defined by the sentence "comprise . . . " does not exclude additional same factor existed in the procedure, method, article or device comprising the factors.

Still further, "and/or" in the previous text represents that the text includes the relation of "and", and also includes the relation of "or", wherein if the solution A and the solution B are the relation of "and", it shows that certain example may include both solution A and solution B simultaneously; if the solution A and the solution B are the relation of "or", it shows that certain example may include the solution A independently, or include the solution B independently.

The present disclosure is described with reference to the flow charts of the method, device (system), and the computer program product, and/or the block diagram. It shall be understood that the combination of the flows and/or the blocks can be achieved by the computer program instructions. These computer program instructions may be provided to the general computer, special computer, embedded processor, or processor of other programmable data processing device to produce a machine, such that an apparatus for achieving the specified function in one or more flows of the flow chart, and/or one or more blocks of the block diagram is produced by the instructions executed by the computer, or processor of other programmable data processing device.

These computer program instructions may also be stored in a readable memory of the computer that can guide the computer, or other programmable data processing device to work in a specific way, such that the instructions stored in the readable memory of the computer produce a manufactured product including a command device which achieves the specified function in one or more flows of the flow chart, and/or one or more blocks of the block diagram.

These computer program instructions may also be loaded to the computer, or other programmable data processing device to execute a series of operation steps on the computer, or other programmable device to produce processing implemented by the computer, such that the instructions executed on the computer, or other programmable device provide steps for achieving the specified function in one or more flows of the flow chart, and/or one or more blocks of the block diagram.

INDUSTRIAL APPLICABILITY (1) As compared to the memory storing the intermediate values outside the functional parts, the memory storing data outside the functional parts needs a longer latency time.

(2) As compared to the memory storing the intermediate values outside the functional parts, the memory storing data outside the functional parts consumes more energy.

(3) As compared to the memory storing the intermediate values outside the functional parts, the memory storing data outside the functional parts greatly increases times of accessing the memory outside the functional parts, and easily causes access conflict of the memory outside the functional parts.

(4) After the functional parts generate the output value, the intermediate values stored in the functional parts will be discarded, which facilitates increasing usable cells of available intermediate value memory, and improving a utilization ratio of the intermediate value memory.

The invention claimed is:

1. An operation apparatus for an acceleration chip for accelerating a deep neural network algorithm, comprising:
   a vector addition processor module for performing addition or subtraction of a vector, and/or a vectorized operation of a pooling layer algorithm in the deep neural network algorithm;
   a vector function value arithmetic unit module for performing a vectorized operation of a non-linear evaluation in the deep neural network algorithm; and
   a vector multiplier-adder module for performing a multiply-add operation on vectors; wherein:
   the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer;
   the vector addition processor module, the vector function value arithmetic unit module and the vector multiplier-adder module are all provided with an intermediate value storage region respectively for storing a vectorized intermediate value calculated according to the instructions and performing read and write operations on a primary memory;
   the vector addition processor module, the vector function value arithmetic unit module and the vector multiplier-adder module, the intermediate value storage regions are accessed through an index;
   during the operation of the vector addition processor module, the vector function value arithmetic unit module and the vector multiplier-adder module, if one or more unwritten positions of a storage block designated by the index previously within the intermediate value storage regions are requested to be read, the intermediate value storage regions refuse this reading request, and the flag which is returned to indicate the success of data reading is invalid; and
   during the operation of the vector addition processor module, the vector function value arithmetic unit module and the vector multiplier-adder module, if one or more written positions of a storage block designated by the index previously within the intermediate value storage regions are requested to be read, the intermediate value storage regions refuse this writing request, and the flag which is returned to indicate the success of data writing is invalid.

2. The operation apparatus for the acceleration chip for accelerating the deep neural network algorithm according to claim 1, wherein after the vector addition processor module, the vector function value arithmetic unit module and the vector multiplier-adder module generate an output value, the intermediate values stored in the intermediate value storage regions are discarded.

3. The operation apparatus for the acceleration chip for accelerating the deep neural network algorithm according to claim 1, wherein the intermediate value storage regions of the vector addition processor module, the vector function value arithmetic unit module and the vector multiplier-adder module are configured as a random-access memory.

4. The operation apparatus for the acceleration chip for accelerating the deep neural network algorithm according to claim 3, wherein the random-access memory is configured to store the intermediate values generated by itself from each of the neurons and the variation amount of the synaptic weight.

5. The operation apparatus for the acceleration chip for accelerating the deep neural network algorithm according to claim 1, wherein the vector addition processor module, the vector function value arithmetic unit module and the vector multiplier-adder module access the intermediate value storage regions through an index.

6. A method for performing operation for using an operation apparatus of an acceleration chip for accelerating a deep neural network algorithm, wherein the operation apparatus comprising:
    a vector addition processor module for performing addition or subtraction of a vector, and/or a vectorized operation of a pooling layer algorithm in the deep neural network algorithm;
    a vector function value arithmetic unit module for performing a vectorized operation of a non-linear evaluation in the deep neural network algorithm; and
    a vector multiplier-adder module for performing a multiply-add operation on vectors; wherein:
    the vector addition processor module, the vector function value arithmetic unit module and the vector multiplier-adder module are configured to execute programmable instructions and interact with each other to calculate values of neurons and a network output result of a neural network, and a variation amount of a synaptic weight representing the interaction strength of the neurons on an input layer to the neurons on an output layer; and
    the vector addition processor module, the vector function value arithmetic unit module and the vector multiplier-adder module are all provided with an intermediate value storage region respectively for storing a vectorized intermediate value calculated according to the instructions, and perform read and write operations on the primary memory;
  the method comprising:
    a vector addition processing operation, in which the vector addition processor module performs addition or subtraction of the vector, and/or the vectorized operation of the pooling layer algorithm in the deep neural network algorithm according to an instruction;
    a vector function value operation, in which the vector function value arithmetic unit module performs the vectorized operation of the non-linear evaluation in the deep neural network algorithm according to an instruction; and
    a vector multiply-add operation, in which the vector multiplier-adder module performs the multiply-add operation on the vector according to an instruction; wherein:
  the vector addition processing operation, the vector function value operation and the vector multiply-add operation interact with each other to calculate values of neurons and a network output result of a neural network, and a variation amount of a synaptic weight representing the interaction strength of the neurons on an input layer to the neurons on an output layer;
  the vectorized intermediate values produced by the vector addition processing operation, the vector function value operation and the vector multiply-add operation are stored in the intermediate value storage regions of the vector addition processor module, the vector function value arithmetic unit module and the vector multiplier-adder module, and the intermediate value storage regions may perform read and write operations on the primary memory;
  in the vector addition processing operation, the vector function value operation and the vector multiply-add operation, the intermediate value storage regions are accessed through an index;
  in the vector addition processing operation, the vector function value operation and the vector multiply-add operation, if one or more unwritten positions of a storage block designated by the index previously within the intermediate value storage regions are requested to be read, the intermediate value storage regions refuse this reading request, and the flag which is returned to indicate the success of data reading is invalid; and
  in the vector addition processing operation, the vector function value operation and the vector multiply-add operation, if one or more written positions of a storage block designated by the index previously within the intermediate value storage regions are requested to be read, the intermediate value storage regions refuse this writing request, and the flag which is returned to indicate the success of data writing is invalid.

7. The method for performing operation for using the operation apparatus of an acceleration chip for accelerating a deep neural network algorithm according to claim 6, wherein:
  in the vector addition processing operation, the vector function value operation and the vector multiply-add operation, after an output value is generated, the intermediate values stored in the intermediate value storage regions are discarded.

\* \* \* \* \*